US008126887B2

(12) United States Patent
Polo-Malouvier et al.

(10) Patent No.: US 8,126,887 B2
(45) Date of Patent: Feb. 28, 2012

(54) APPARATUS AND METHOD FOR SEARCHING REPORTS

(75) Inventors: Ricardo Polo-Malouvier, Levallois-Perret (FR); Grégoire Jean Antoine Cacheux, Puteaux (FR); Gilles Vergnory-Mion, Vaucresson (FR)

(73) Assignee: Business Objects Software Ltd., Dublin (IE)

( * ) Notice: Subject to any disclaimer, the term of this patent is extended or adjusted under 35 U.S.C. 154(b) by 207 days.

(21) Appl. No.: 11/537,597

(22) Filed: Sep. 29, 2006

(65) Prior Publication Data
US 2008/0082495 A1    Apr. 3, 2008

(51) Int. Cl.
G06F 7/00 (2006.01)
G06F 17/30 (2006.01)

(52) U.S. Cl. ......... 707/729; 707/741; 707/769; 715/219
(58) Field of Classification Search .......... 707/741–743, 707/729, 769, 912; 715/219, 220
See application file for complete search history.

(56) References Cited

U.S. PATENT DOCUMENTS

| | | | |
|---|---|---|---|
| 5,550,971 A | 8/1996 | Brunner et al. | |
| 5,657,437 A | 8/1997 | Bishop et al. | |
| 5,664,182 A * | 9/1997 | Nierenberg et al. | 707/102 |
| 5,692,181 A | 11/1997 | Anand et al. | |
| 5,721,903 A | 2/1998 | Anand et al. | |
| 5,740,429 A | 4/1998 | Wang et al. | |
| 5,862,400 A | 1/1999 | Reed et al. | |
| 5,875,446 A * | 2/1999 | Brown et al. | 707/3 |
| 6,026,388 A | 2/2000 | Liddy et al. | |
| 6,081,810 A * | 6/2000 | Rosenzweig et al. | 707/104.1 |
| 6,134,563 A * | 10/2000 | Clancey et al. | 715/210 |
| 6,247,018 B1 * | 6/2001 | Rheaume | 707/102 |
| 6,317,758 B1 | 11/2001 | Madsen et al. | |
| 6,341,286 B1 * | 1/2002 | Kawano | 707/101 |
| 6,393,422 B1 * | 5/2002 | Wone | 707/10 |
| 6,539,370 B1 * | 3/2003 | Chang et al. | 707/2 |
| 6,578,046 B2 | 6/2003 | Chang et al. | |
| 6,581,054 B1 | 6/2003 | Bogreet | |
| 6,609,123 B1 | 8/2003 | Cazemier et al. | |
| 6,711,579 B2 | 3/2004 | Balakrishnan | |
| 6,721,745 B2 * | 4/2004 | Monestere, III | 707/10 |
| 6,772,156 B1 * | 8/2004 | Rogers et al. | 707/9 |
| 6,778,979 B2 | 8/2004 | Grefensette et al. | |
| 6,831,668 B2 | 12/2004 | Cras et al. | |
| 7,152,200 B2 | 12/2006 | Albert et al. | |
| 7,287,214 B1 * | 10/2007 | Jenkins et al. | 715/205 |
| 7,293,031 B1 | 11/2007 | Dusker et al. | |

(Continued)

OTHER PUBLICATIONS

Domeniconi et al., Subspace clustering of high dimensional data (undated article). Google search 2004 (pp. 1-5).

(Continued)

Primary Examiner — John R. Cottingham
Assistant Examiner — James E. Richardson
(74) Attorney, Agent, or Firm — Mintz, Levin, Cohn, Ferris, Glovsky and Popeo, P.C.

(57) ABSTRACT

A method of searching at least one report includes extracting at least one of report element instance content, report element instance metadata, report element instance data, and at least one of associated report element instance context content, report element instance context metadata and report element instance context data to define indexed fields. A search query is received. The search query is applied against at least one indexed field. Search query results are compiled to produce a list of relevant report element instances.

19 Claims, 12 Drawing Sheets

U.S. PATENT DOCUMENTS

| | | | |
|---|---|---|---|
| 7,356,779 | B2 | 4/2008 | Cras et al. |
| 7,546,312 | B1 | 6/2009 | Xu et al. |
| 2002/0123994 | A1* | 9/2002 | Schabes et al. .................. 707/5 |
| 2002/0161799 | A1 | 10/2002 | Maguire et al. |
| 2003/0110467 | A1 | 6/2003 | Balakrishnan |
| 2003/0212666 | A1 | 11/2003 | Basu et al. |
| 2003/0215137 | A1* | 11/2003 | Wnek ........................ 382/181 |
| 2004/0024739 | A1* | 2/2004 | Copperman et al. .............. 707/1 |
| 2004/0088650 | A1* | 5/2004 | Killen et al. .................. 715/503 |
| 2004/0117731 | A1 | 6/2004 | Blyashov |
| 2004/0123246 | A1* | 6/2004 | Wu ............................. 715/530 |
| 2004/0267740 | A1 | 12/2004 | Liu et al. |
| 2005/0027687 | A1 | 2/2005 | Nowitz et al. |
| 2005/0076003 | A1 | 4/2005 | DuBose et al. |
| 2005/0144554 | A1* | 6/2005 | Salmon et al. ............. 715/501.1 |
| 2005/0182709 | A1 | 8/2005 | Belcsak et al. |
| 2005/0198068 | A1 | 9/2005 | Mukherjee et al. |
| 2005/0203876 | A1* | 9/2005 | Cragun et al. .................... 707/3 |
| 2005/0210389 | A1 | 9/2005 | Middelfart |
| 2005/0234889 | A1 | 10/2005 | Fox et al. |
| 2006/0047565 | A1 | 3/2006 | Gilfix et al. |
| 2006/0069696 | A1 | 3/2006 | Becker et al. |
| 2006/0136407 | A1 | 6/2006 | Dettinger et al. |
| 2006/0167860 | A1 | 7/2006 | Eliashberg et al. |
| 2006/0195424 | A1 | 8/2006 | Wiest et al. |
| 2006/0271841 | A1 | 11/2006 | Thanu et al. |
| 2006/0293982 | A1 | 12/2006 | Hicks et al. |
| 2006/0294069 | A1* | 12/2006 | Carlson et al. .................... 707/3 |
| 2007/0038948 | A1 | 2/2007 | Cornacchia |
| 2007/0150862 | A1 | 6/2007 | Naibo et al. |
| 2008/0040308 | A1 | 2/2008 | Ranganathan et al. |

OTHER PUBLICATIONS

Tory et al., A parallel coordinates style interface for exploratory volume visualization. IEEE Transactions on Visualization & Computer Graphics vol. 11:1 (Jan.-Feb. 2005).

Fitzgerald, Special edition using crystal reports pp. 244-261 (Jul. 14, 2004).

KYD, Set up common-age charts with excel and OLAP data (Nov. 4, 2004).

Business Objects S.A., PCT/US2007/077998 Int'l Search Report, (Jul. 8, 2008).

Business Objects S.A., PCT/US2007/078003 Int'l Search Report, (Mar. 25, 2008).

Business Objects S.A., Int'l Search Report, PCT/US2007/078002 (Mar. 25, 2008).

* cited by examiner

| | 901 | 903 | 905 | 907 | 909 | 911 |
|---|---|---|---|---|---|---|
| | Content= | Metadata= | Data= | Content= | Metadata= | Data= |
| 902 | Country Sales France USA 100 230 | Country Sales | France USA | *2001 Q1* | *Year Quarter* | *2001 Q1* |
| 904 | Country Sales France USA 110 250 | Country Sales | France USA | *2001 Q2* | *Year Quarter* | *2001 Q2* |
| 906 | Country Sales France USA 103 229 | Country Sales | France USA | *2001 Q3* | *Year Quarter* | *2001 Q3* |
| 908 | Country Sales France USA 150 260 | Country Sales | France USA | *2001 Q2* | *Year Quarter* | *2001 Q2* |
| 910 | Country Sales France USA 138 210 | Country Sales | France USA | *2002 Q1* | *Year Quarter* | *2002 Q1* |
| 912 | Country Sales France USA 121 234 | Country Sales | France USA | *2002 Q2* | *Year Quarter* | *2002 Q2* |
| 914 | Country Sales France USA 198 259 | Country Sales | France USA | *2002 Q3* | *Year Quarter* | *2002 Q3* |
| 916 | Country Sales France USA 200 300 | Country Sales | France USA | *2002 Q4* | *Year Quarter* | *2002 Q4* |

FIG. 9

APPARATUS AND METHOD FOR SEARCHING REPORTS

CROSS REFERENCE TO RELATED APPLICATIONS

This application is related to commonly owned U.S. patent application Ser. No. 11/269,145, filed Nov. 7, 2005, which is herein incorporated herein by reference in its entirety. This application is also related to the commonly owned and concurrently filed U.S. patent applications titled "Apparatus and Method For Receiving a Report", Ser. No. 11/537,587, filed Sep. 29, 2006, and "Apparatus and Method for Generating Queries and Reports", Ser. No. 11/537,592, filed Sep. 29, 2006, which are incorporated herein by reference in their entirety.

BRIEF DESCRIPTION OF THE INVENTION

This invention relates generally to data retrieval. More particularly, this invention relates to techniques for searching business intelligence data.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information; content delivery infrastructure systems for delivery and management of reports and analytics; data warehousing systems for cleansing and consolidating information from disparate sources; and data management systems, such as relational databases or On Line Analytic Processing (OLAP) systems used to collect, store, and manage raw data.

A subset of business intelligence tools are report generation tools. There are a number of commercially available products to produce reports from stored data. For instance, Business Objects Americas of San Jose, Calif., sells a number of widely used report generation products, including Crystal Reports™, Business Objects OLAP Intelligence™, Business Objects Web Intelligence™, and Business Objects Enterprise™. As used herein, the term report refers to information automatically retrieved (i.e., in response to computer executable instructions) from a data source (e.g., a database, a data warehouse, a plurality of reports, and the like), where the information is structured in accordance with a report schema that specifies the form in which the information should be presented. A non-report is an electronic document that is constructed without the automatic retrieval of information from a data source. Examples of non-report electronic documents include typical business application documents, such as a word processor document, a presentation document, and the like.

A report document specifies how to access data and format it. A report document where the content does not include external data, either saved within the report or accessed live, is a template document for a report rather than a report document. Unlike other non-report documents that may optionally import external data within a document, a report document by design is primarily a medium for accessing and formatting, transforming or presenting external data.

A report is specifically designed to facilitate working with external data sources. In addition to information regarding external data source connection drivers, the report may specify advanced filtering of data, information for combining data from different external data sources, information for updating join structures and relationships in report data, and logic to support a more complex internal data model (that may include additional constraints, relationships, and metadata).

In contrast to a spreadsheet, a report is generally not limited to a table structure but can support a range of structures, such as sections, cross-tables, synchronized tables, sub-reports, hybrid charts, and the like. A report is designed primarily to support imported external data, whereas a spreadsheet equally facilitates manually entered data and imported data. In both cases, a spreadsheet applies a spatial logic that is based on the table cell layout within the spreadsheet in order to interpret data and perform calculations on the data. In contrast, a report is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheets generally work within a looping calculation model, whereas a report may support a range of calculation models. Although there may be an overlap in the function of a spreadsheet document and a report document, these documents express different assumptions concerning the existence of an external data source and different logical approaches to interpreting and manipulating imported data.

State of the art search techniques developed for searching generally unstructured datasets may not be suited for application to search for data within reports, and specifically business intelligence reports. Such state of the art search techniques commonly limit the ranking of searched data to the prominence or frequency of "hits" related to a search query, without incorporating data semantics in the determination of ranking. This generally results in less relevant or meaningful search results when applied to reports, and specifically to complex business intelligence reports.

Accordingly, it would be desirable to provide improved techniques for searching reports.

SUMMARY OF INVENTION

The invention includes a computer readable medium storing executable instructions to search at least one report. Executable instructions extract at least one of report element instance content, report element instance metadata and report element instance data, and at least one of associated report element instance context content, report element instance context metadata and report element instance context data to define indexed fields. A search query is received. The search query is applied against at least one indexed field. Search query results are compiled to produce a list of relevant report element instances.

The invention also includes a method of searching at least one report by extracting at least one of report element instance content, report element instance metadata, report element instance data, and at least one of associated report element instance context content, report element instance context metadata and report element instance context data to define indexed fields. A search query is received. The search query is applied against at least one indexed field. Search query results are compiled to produce a list of relevant report element instances.

BRIEF DESCRIPTION OF THE FIGURES

The invention is more fully appreciated in connection with the following detailed description taken in conjunction with the accompanying drawings, in which:

FIG. 9 illustrates a third simplified index table created from the simplified report of FIGS. 4-7.

Like reference numerals refer to corresponding parts throughout the several views of the drawings.

DETAILED DESCRIPTION OF THE INVENTION

Figure 1:
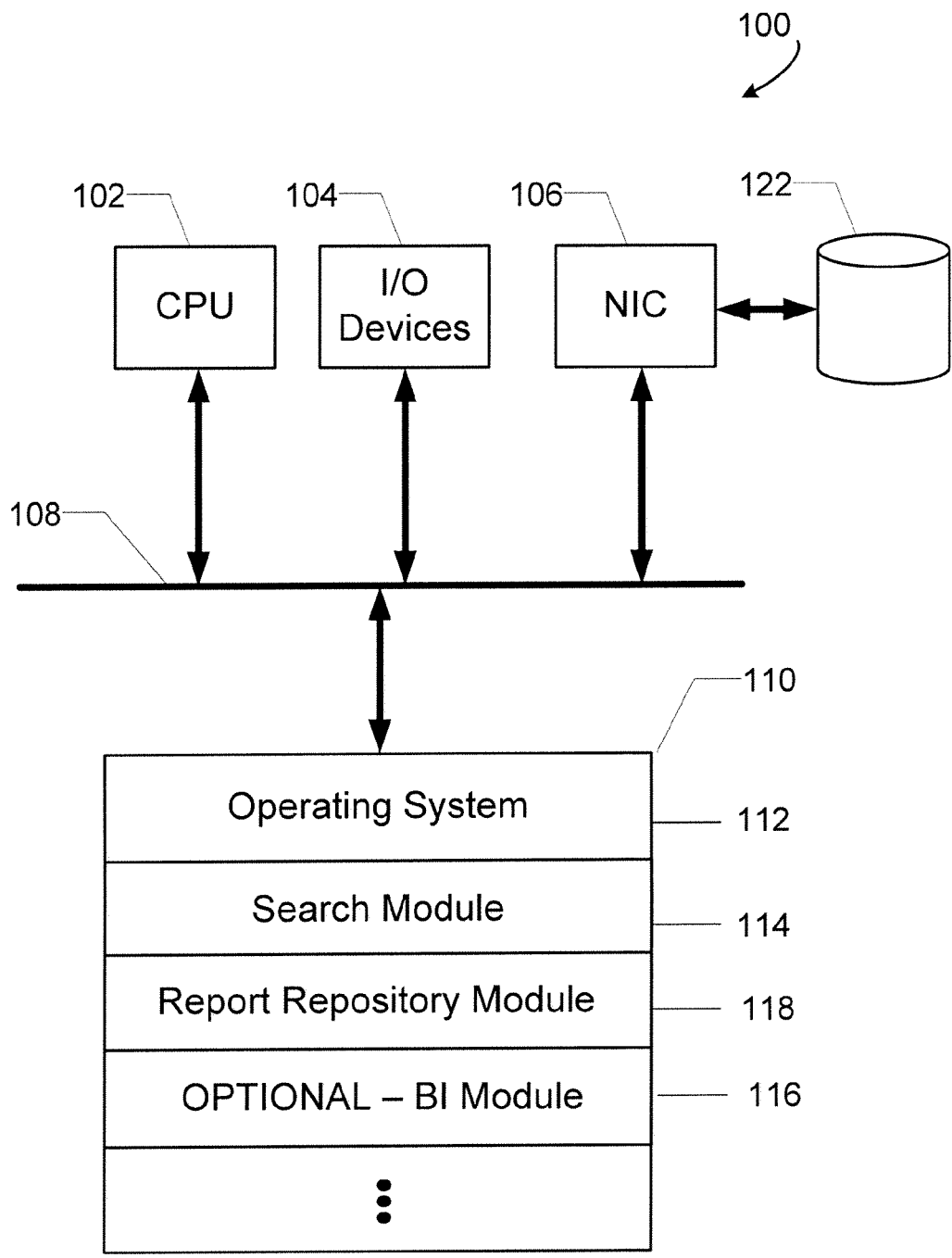
FIG. 1 illustrates a computer configured in accordance with an embodiment of the invention.

Various aspects of the present invention will now be set forth. Prior to such description, a glossary of terms used throughout this description is provided.

A report element is any structural component that may be found inside a report, examples of which comprise: a table, a cell, a cross-tab, a chart, a section, a page header and a page footer.

A report element instance is a single particular occurrence of a report element in a given report, such as a cell or a table. In a single report where a given report element is repeated multiple times, each occurrence of the report element comprises a report element instance. Typically a report comprises multiple report element instances.

The context of a report element instance comprises the combination of parameters that affect the evaluation or calculation of the report element instance. The combination of parameters are related to the value of the instance. The combination of parameters may include a data reference from a higher, lower or similar level in a data hierarchy that relate to the value of the report element instance. In the particular case of report element instances that are calculated values or measures, the context of the report element instance may include the formula and/or data used to calculate the instance, which may be described as a computational context. In one embodiment the context of a report element instance may comprise one or more of: formulas, indices comprising at least one ordered list of one or more dimensions and/or datasource table columns with sort information for each, and filter expressions that define or limit the parameters used in evaluating or calculating the report element instance.

Report element instance content is defined as the data and metadata that is actually displayed in a report for a selected report element instance. Examples of report element instance content includes: the data displayed inside a table element (including row/column data and column name metadata) and values of data and dimensions used to display a chart (including all text displayed in the chart).

Report element instance context content is defined as parameters which are related to a value of a report element instance for a given context of that instance. An example of report element instance context content is a related displayed content reference that may affect the evaluation or calculation of the report element instance, or is otherwise related to the report element instance.

Report element instance metadata is defined as the combination of all metadata associated with a report element instance. Report element instance metadata may comprise displayed content that does not result from computation or evaluation of data values like measure or dimension values, such as the column names for a table which are displayed in the table header. Report element instance metadata may also comprise non-displayed metadata from the report specification and related report elements which is used to compute and evaluate the report element instance value (such as the name of a parameter or business object of which individual values are actually displayed in the report, an example of which is the "Revenue" parameter or object name specified for a table column which displays Revenue values). Report element instance metadata may also comprise references to one or more datasources, such as a relational or OLAP database, XML or web file, or another report, which datasource may be referenced directly or through a datasource abstraction layer (such as a semantic layer as defined in commonly owned U.S. Pat. No. 5,555,403 and its continuations) which then references the datasource. In a case where report element instance metadata comprises a report parameter, the report parameter may be a selected report parameter or an unselected report parameter. Report element instance metadata may also comprise security or access control information, such as security permissions, report origin information, such as report author identification, or report validation information, such as approvals or trust ratings.

Report element instance context metadata is defined as metadata values which are related to a report element instance as part of the context of that instance. An example of report element instance context metadata is a metadata reference that may affect the evaluation or calculation of a value for the report element instance, or is otherwise related to a value of the report element instance.

Report element instance data is the original data within a report element instance. Thus, report element instance data does not include displayed calculated values such as measures values, and does not include displayed report element instance metadata. An example of report element instance data for a table report element comprises all displayed column data in the table except calculated or measure values, header and footer metadata (such as column names) and parameter or business object names. Typically, this may include all original data values displayed in a report element instance as they appear in a data source or table (i.e., not including calculated values resulting from a calculation of one or more original data values, and not including metadata displayed in a report element instance). Another example of report element instance data for a chart displayed in a report are the data values used to construct and display the chart, but not including calculated values or displayed metadata in the chart.

Report element instance context data is defined as data values which are related to a report element instance as part of the context of that instance. An example of report element instance context data is a related data reference that may affect the evaluation or calculation of the report element instance, or is otherwise related to the report element instance.

FIG. 1 illustrates a computer 100 configured in accordance with an embodiment of the invention. The computer 100 includes standard components, including a central processing unit 102 and input/output devices 104, which are linked by a bus 108. The input/output devices 104 may include a keyboard, mouse, touch screen, monitor, printer, and the like. A network interface circuit 106 is also connected to the bus 108. The network interface circuit 106 provides connectivity to a network, such as a networked data repository 122, thereby allowing the computer 100 to operate in a networked environment.

A memory 110 is also connected to the bus 108. The memory 110 stores executable instructions to implement operations of the invention. In one embodiment, the executable instructions include an operating system module 112. The operating system module 112 may include instructions for handling various system services, such as file and application services or for performing hardware dependant tasks. The operating system module 112 may include instructions for implementing a graphical user interface (GUI), which may rely upon standard techniques to produce graphical components of a user interface, e.g., windows, icons, buttons, menus and the like. The user interface may include instructions to receive input from a pointer device and display a cursor on an output device.

Memory 110 also stores a search module 114. The search module 114 comprises executable instructions to extract and index report element instances and to execute search queries against indexed report element instances. The search module 114 may also comprise instructions to access stored reports from a memory, or other storage location, such as networked data repository 122, in order to extract and index report element instances from the stored reports. Search module 114 may be used to implement the operations of FIG. 2.

Memory 110 also stores Report Repository Module 118. Report Repository Module 118 comprises executable instructions to store and access one or more reports. In one embodiment of the present invention, the Report Repository Module 118 comprises a file directory storing one or more reports and executable instructions to store and access the reports. In another embodiment, the Report Repository Module 118 comprises executable instructions to store and access report documents on a suitable storage medium such as networked data repository 120 connected to computer 100.

Memory 110 may also store optional BI module 116. Optional BI module 116 comprises executable instructions to perform Business Intelligence (BI) related functions, such as, generate, view or share reports, perform queries and analyses, and the like. In one embodiment, BI module 116 stores instructions to create, store and access report template documents which declaratively define the content and format of one or more reports, and generates one or more reports based on a report template. Generated reports may be stored and accessed by the Report Repository Module 118.

The executable modules stored in memory 110 are exemplary. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed. For example, in one embodiment of the present invention, search module 114 may be implemented on a client computer, while the Report Repository Module 118 and/or optional BI module 116 may be implemented on a server computer.

Figure 1A:
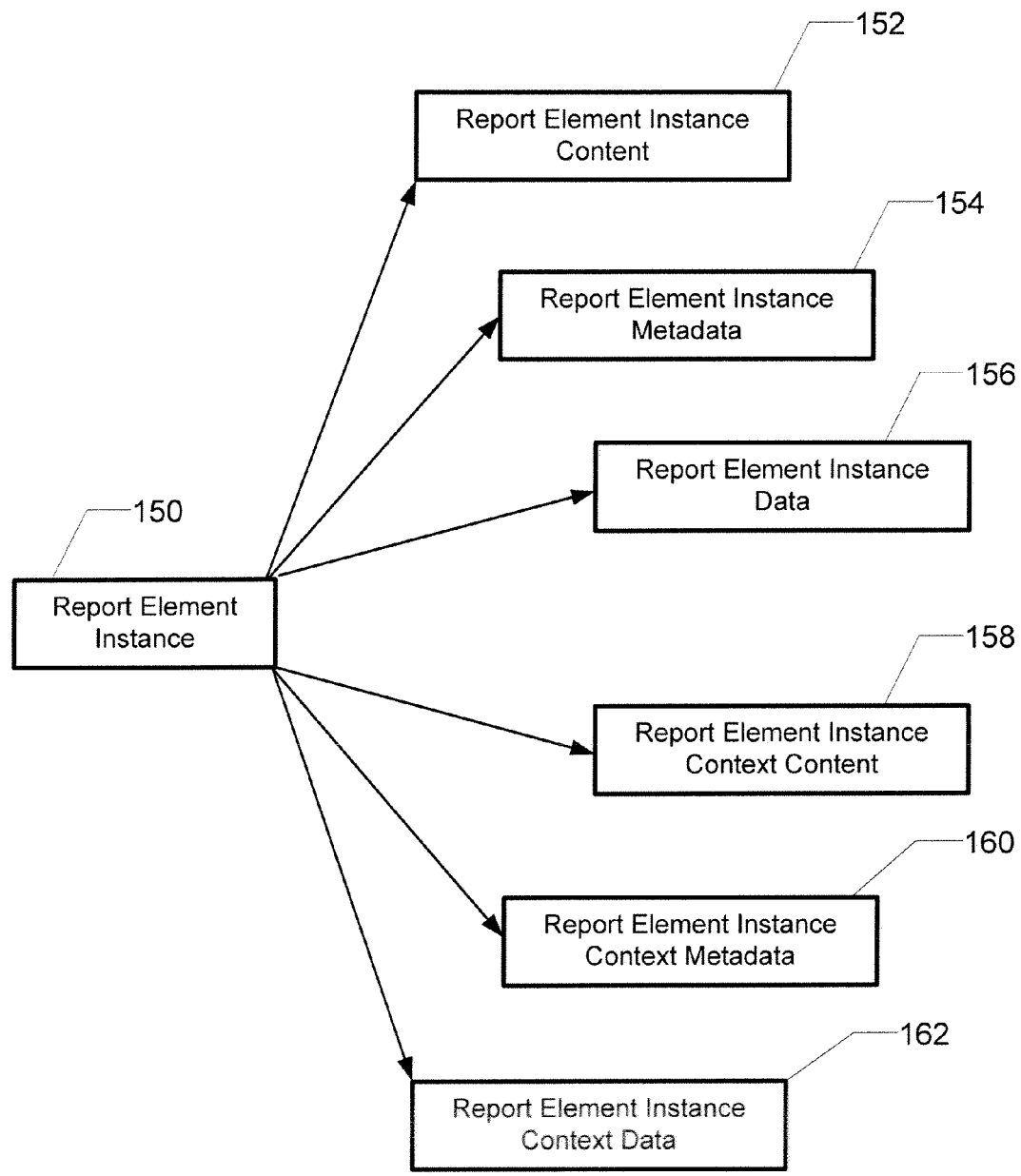
FIG. 1A illustrates a simplified exemplary mapping of a report element instance to multiple index values.

FIG. 1A illustrates a simplified exemplary mapping of a report element instance 150 to multiple values suitable for indexing in indexed fields. In one embodiment of the invention, each report element instance 150 appearing in a report may include one or more of report element instance content 152, report element instance metadata 154 and report element instance data 156, as defined above. Additionally, each report element instance 150 may comprise one or more of a context, which includes report element instance context content 158, report element instance context metadata 160 and report element instance context data 162, as defined above.

Figure 2:
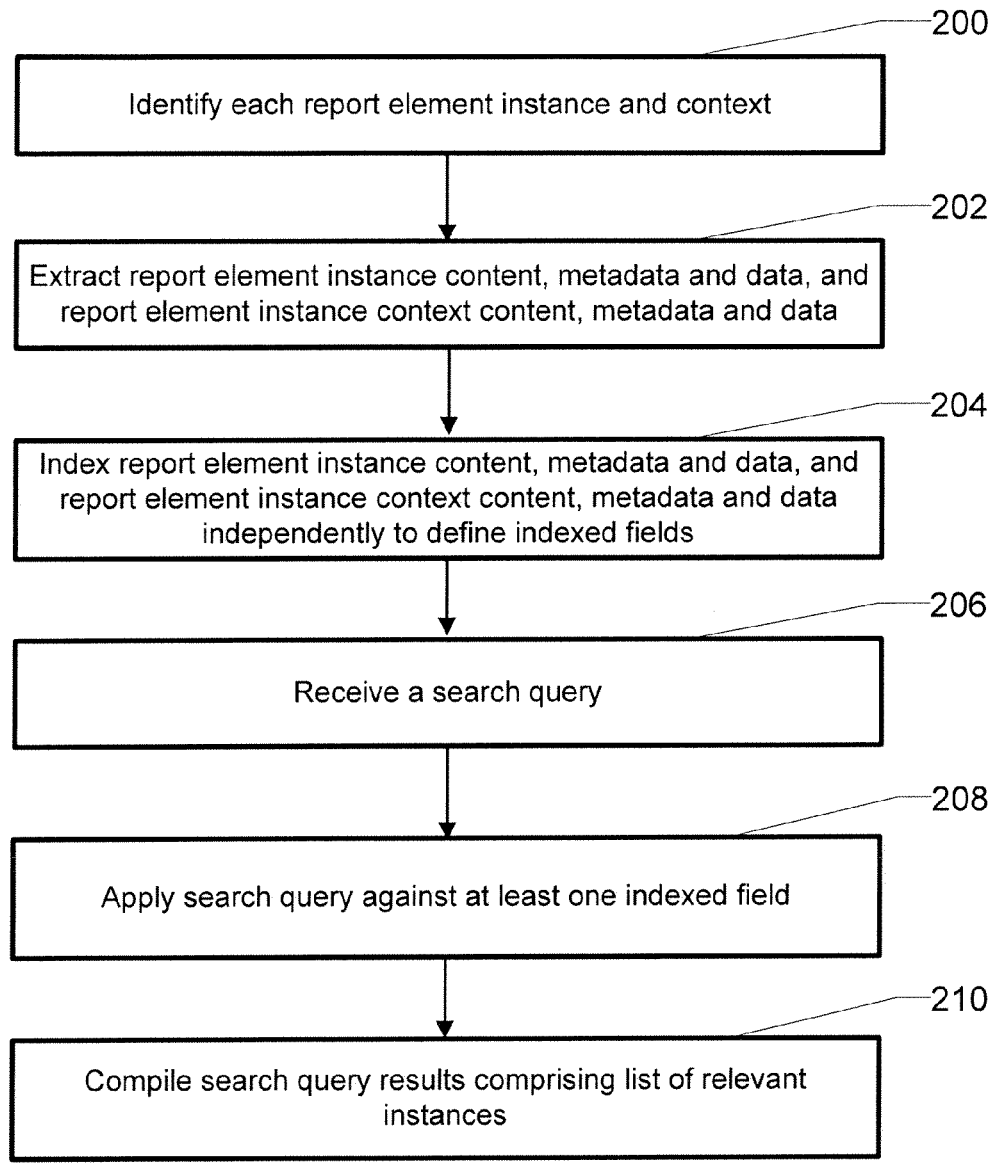
FIG. 2 illustrates processing operations associated with an embodiment of the invention.

FIG. 2 illustrates a series of processing operations that may be implemented by the computer 100 of FIG. 1, and more specifically, by search module 114. The first processing operation of FIG. 2 is to identify each report element instance and report element instance context 200. In one embodiment, operation 200 is implemented on one report at a time sequentially, to identify each individual report element instance and each report element instance context. Alternatively, operation 200 is implemented on more than one report in parallel or on a set of reports simultaneously. In a further alternative embodiment, operation 200 is implemented at the time when a report is being designed. Reports to be processed in operation 200 may be accessed from any suitable data storage repository comprising reports, such as from report repository module 118 in memory 110 or from networked data repository 122.

The next operation of FIG. 2 is to extract report element instance content, metadata and data, and report element instance context content, metadata and data 202. In one embodiment, extracted values of report element instance content, metadata and data, and report element instance context content, metadata and data may be stored on a suitable data storage medium while the extraction operation proceeds through all of a selected report or set of reports being processed. Alternatively, extracted report element instance content, metadata and data, and report element instance context content, metadata and data values may each be passed separately to the next operation 204, described below, for processing before the next value is extracted from the report.

The next operation of FIG. 2 is to index report element instance content, metadata and data, and report element instance context content, metadata and data independently to define indexed fields 204. Index records created in operation 204 comprising values for report element instance content, metadata and data, and report element instance context content, metadata and data may be stored on any suitable data storage medium, such as in a data repository. In one embodiment, index records for report element instances that have the same report element instance context content, metadata and/or data are stored together in one composite index record. In another embodiment, index records created in operation 204, arranged in indexed fields may be stored in a data repository particularly suited for receiving queries against the indexed fields, such as a database. In an alternative embodiment, index records created in operation 204 may be stored as part of the report document from which they were extracted, or as part of an index file or object linked to the report document from which they were extracted.

In a further embodiment of the invention, operation 204 includes storing a reference to the report, sub-report and/or section of the report in the index record for the report element instance. In the case of a composite index record, comprising index records for multiple report element instances that have the same report element instance context content, metadata and/or data, a reference to the report, sub-report and/or section comprising the multiple report element instances is stored in the composite index record. In this embodiment, operation 204 may include storing a reference to the data source(s) from which the report element instance values were retrieved and/or calculated in the index record for the report element instance.

The next operation of FIG. 2 is to receive a search query 206. In one embodiment, the search query is provided by a user, such as through a search user interface. Alternatively, the search query is automatically generated, such as by a data mining program. The received search query typically comprises one or more search terms.

The next operation of FIG. 2 is to apply the search query against at least one indexed field 208. In one embodiment, the application of the received search query against at least one of the individual report element instance content, metadata, data, or report element instance context content, metadata, or data indexed fields may be implemented in a system suited for running queries against index records arranged in indexed fields, which may be incorporated in search module 114. Alternatively, a suitable system for implementing the application of the search query against indexed fields, such as a database system, may be located external to search module 114, such as on another computer (not shown) which may be dedicated for the purpose of applying search queries against indexed fields. In another embodiment, each search term in the received search query may be applied against each of the report element instance content, report element instance metadata, report element instance data, report element instance context content, report element instance context metadata and report element instance context data indexed fields. Thus, a search query result will be returned if a search term matches any of the indexed fields. In a case where the search query comprises multiple search terms combined with one or more Boolean operators (e.g., "AND", "OR", etc.), each search term is applied against each indexed field. Any match of a first search term with one or more indexed field values may be combined with any match of a second search term with one or more indexed fields according to the Boolean logic relating the first and second search terms.

The next operation of FIG. 2 is to compile search query results comprising a list of relevant report element instances 210. In one embodiment, the list of relevant report element instances comprises report element instances having values for report element instance content, metadata, data, or report element instance context content, metadata or data that match at least one search term of the search query. This list of relevant report element instances may be presented to a user. Alternatively, such as in the case where the search query was generated automatically, the compiled search query results comprising a list relevant report element instances may be stored on a suitable data storage medium, or passed to other processing operations such as a program or module.

Figure 10:
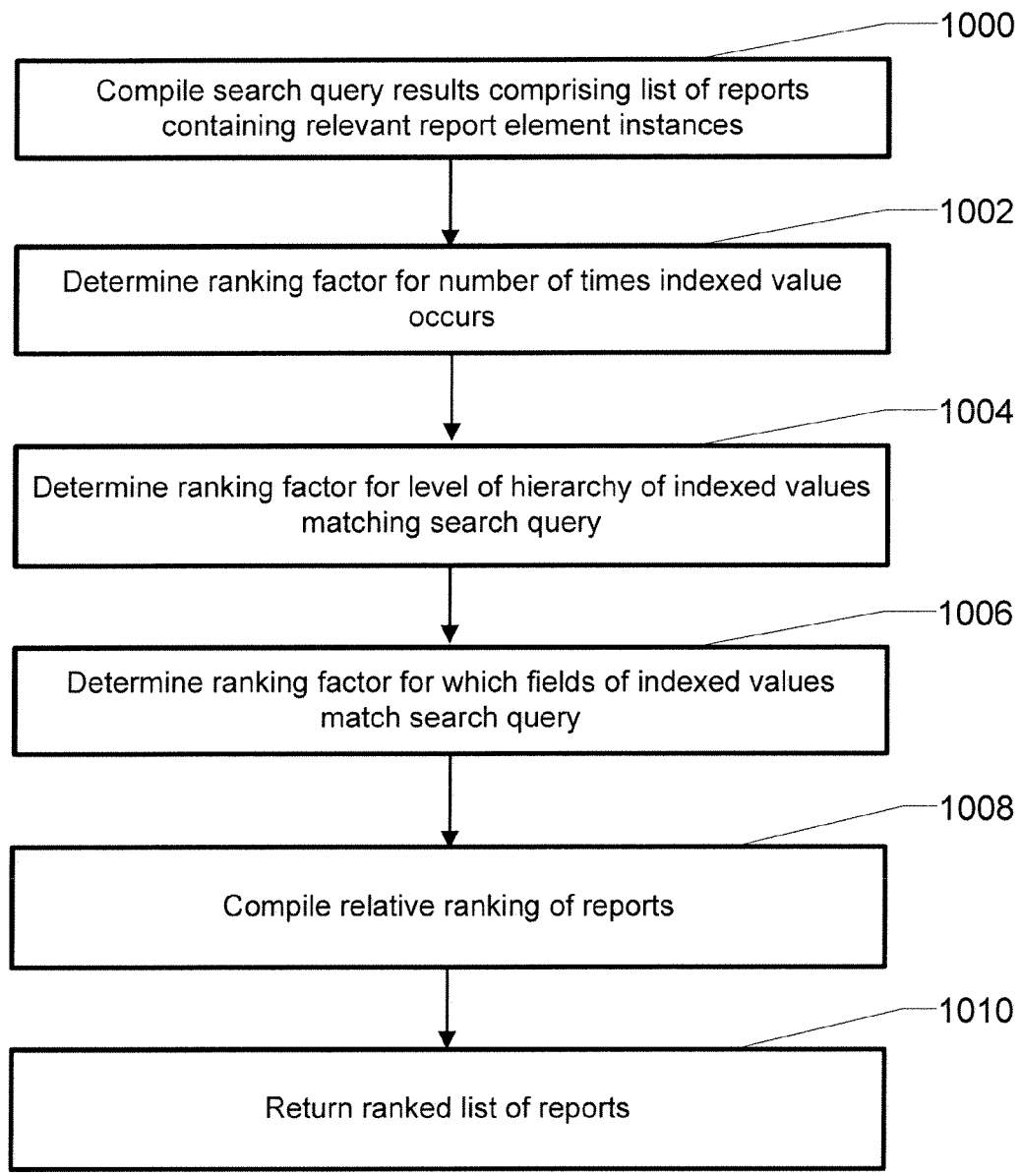
FIG. 10 illustrates processing operations associated with an embodiment of the invention related to ranking of search results

In one embodiment of the invention, operation 210 may additionally comprise ranking one or more reports and/or sub-reports based on the relevancy of the report element instances they contain. In this way, a ranked list of reports may be provided as results for a particular query, which may be of use to a user or computer to determine which report(s) contain information related to the search query, in the report element instance values displayed in the report, and in the context of the report element instance values. An exemplary series of processing operations for ranking reports and/or sub-reports is illustrated in FIG. 10 below.

In another embodiment of the invention, index records created according to operation 204 may be organized and/or stored in exemplary tabular index records, such as those illustrated and described in FIGS. 7-9 below. In this case, a search query may be applied against each extracted report element instance content, report element instance metadata, report element instance data, report element instance context content, report element instance context metadata and report element instance context data in an index record in operation 208. This determines whether the search query matches any of the extracted report element instance or report element instance context values for the indexed report element instance.

In another embodiment of the invention, operations 200, 202 and 204 of the FIG. 2 may implemented in advance of operations 206, 208, and 210, in order to compile index records of one or more reports, which may be stored on a suitable data storage medium such as in a search database. In this case, operations 206, 208, and 210 may then be implemented some time after operations 200, 202 and 204, in order to receive and apply a search query against the index records, and to compile query results. In a further embodiment, operations 200, 202, and 204 may be implemented by a separate machine in advance of operations 206, 208, and 210, such as by a dedicated server or the like. In one embodiment, indexing operations 200, 202 and 204 may be initiated one or more of several exemplary trigger scenarios, comprising: by arbitrary decision of a user, by scheduled one time or repeating cyclical indexing events, and upon refresh or revision of one or more reports which may logically necessitate re-indexing.

Figure 3:
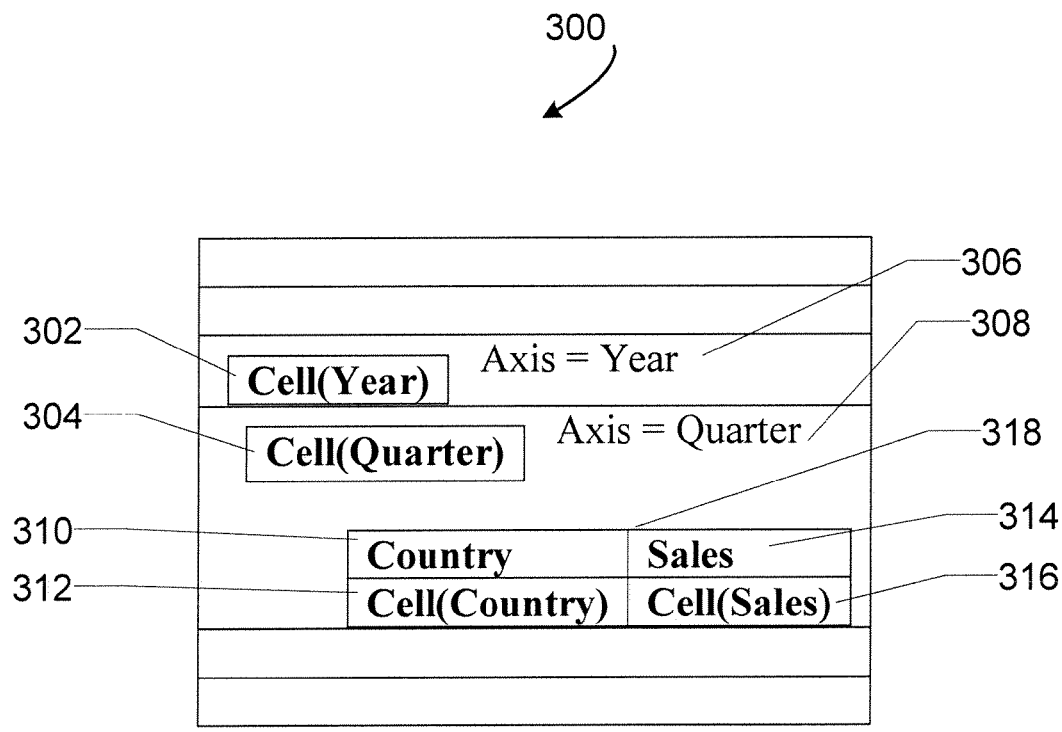
FIG. 3 illustrates a simplified report template document configured in accordance with an embodiment of the invention.

FIG. 3 depicts a graphical representation of a simplified exemplary report template 300 according to an embodiment of the invention. The report template 300 comprises a declarative description of a report intended to summarize Sales of a particular product by Country, for each quarter of each year. The report template 300 comprises two sections, a first section with an Axis equal to the current Year 306, and a second section with an Axis equal to the current Quarter 308. The first section 306 comprises a Cell report element 302 displaying the current year. The second section 308 comprises a Cell report element 304 displaying the current quarter, and a table report element 318 comprising two axes, the Country dimension 310, and the Sales measure 314. The body of the table 318 comprises two cell report elements, one displaying the current Country 312, and a second displaying the associated Sales value for that country 316.

According to one embodiment of the invention, in a document specifying the design of a report, such as report template 300, the axis of a report element contains at least one dimension and/or data source table column and also typically contains indications about the order in which each dimension and/or table column may be enumerated along the axis. For instance, in a report template document, one could define an axis comprising dimensions "Country (alphabetical ascending), followed by Product (database order)" for a table in a report generated from the report template.

Each of the above described reporting elements may be repeated along its axis when the report template is used to generate a report, depending upon the parameters of the report. For example, the second section of the report template with a Quarter Axis 308 may be repeated four times for generating a report covering the four quarters of one year.

All constant report items have been suppressed for simplicity in the exemplary report template of FIG. 3. For example, typically each table header may contain a cell with a user-specified description or title for the table, such as the name of each dimension on the table's axis. In an embodiment of the present invention directed toward the search of a report specification, the operations of FIG. 2 may be implemented on a report template document such as that illustrated in FIG. 3, instead of or in conjunction with one or more report instances comprising retrieved data.

Figure 4:
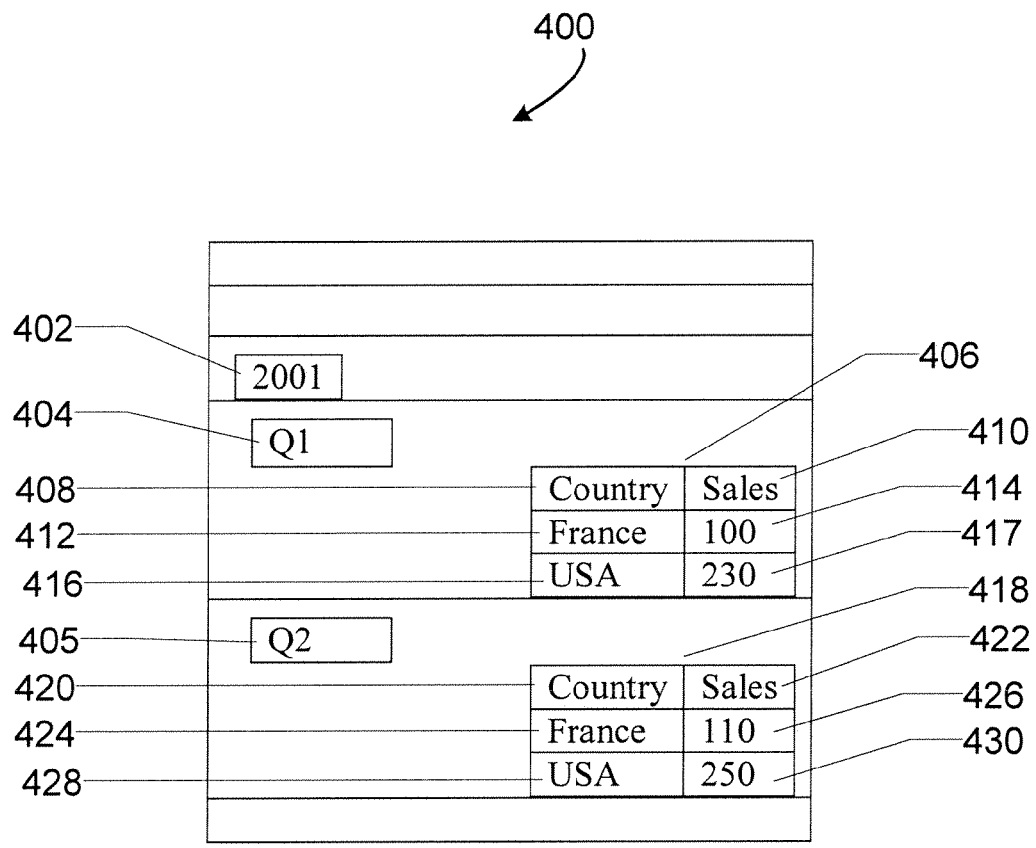
FIG. 4 illustrates a section of a simplified report generated from the report specification of FIG. 3 in accordance with an embodiment of the invention.

FIG. 4 illustrates the first section 400 of a simplified exemplary report generated from the report specification of FIG. 3. Report section 400 comprises Year cell 402 and Quarter cells 404 and 405, and tables 406 and 418. Table 406 comprises Country dimension 408 and Sales measure 410, Country cells 412 and 416, and corresponding Sales cells 414 and 417. Similarly, table 418 comprises County dimension 420 and Sales measure 422, Country cells 424 and 428 and corresponding Sales cells 426 and 43).

Figure 5:
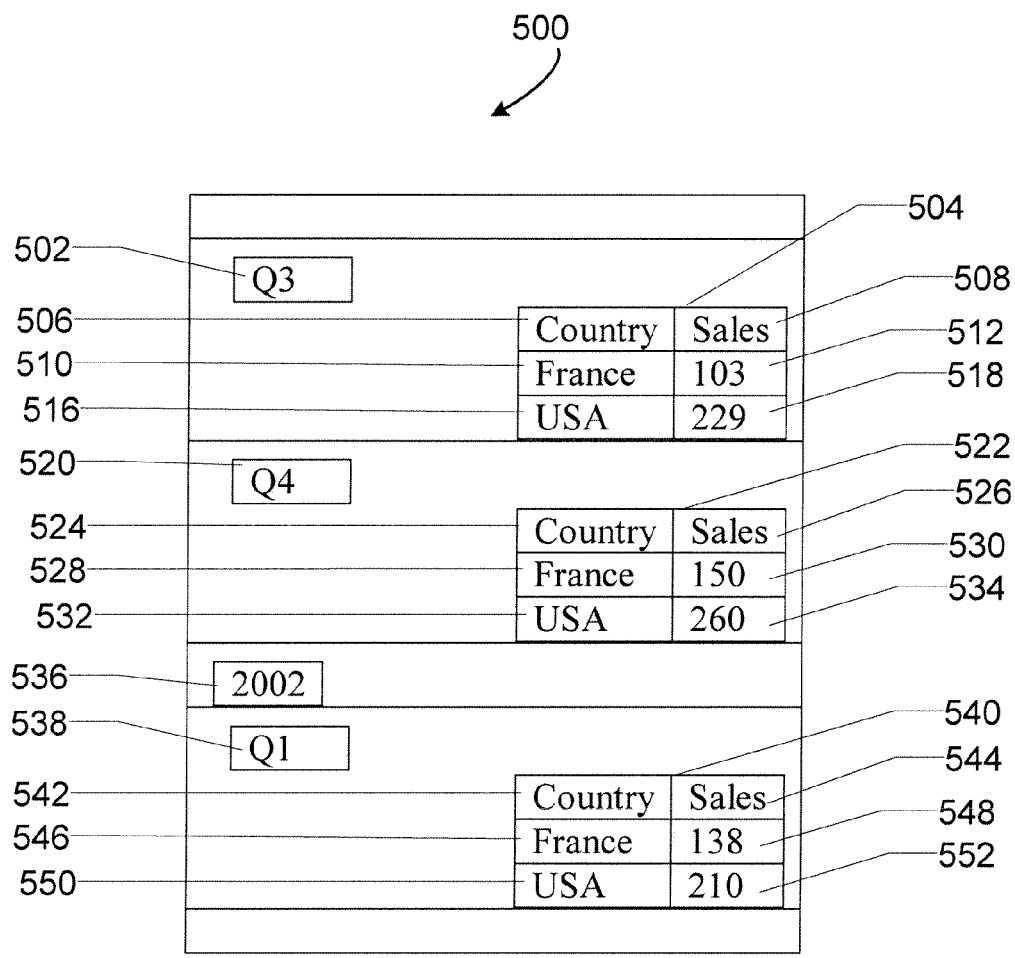
FIG. 5 illustrates a second section of a simplified report generated from the report specification of FIG. 3 in accordance with an embodiment of the invention.

FIG. 5 illustrates the second section 500 of the simplified exemplary report of FIG. 4. Report section 500 comprises Quarter cells 502, 520 and 538, Year cell 536, and tables 504, 522 and 540. Table 504 comprises Country dimension 506 and Sales measure 508, Country cells 510 and 516, and corresponding Sales cells 512 and 518. Similarly, table 522 comprises Country dimension 524 and Sales measure 526, Country cells 528 and 532, and corresponding Sales cells 530 and 534. Further, Table 540 comprises Country dimension 542 and Sales measure 544, Country cells 546 and 550, and corresponding Sales cells 548 and 552.

Figure 6:
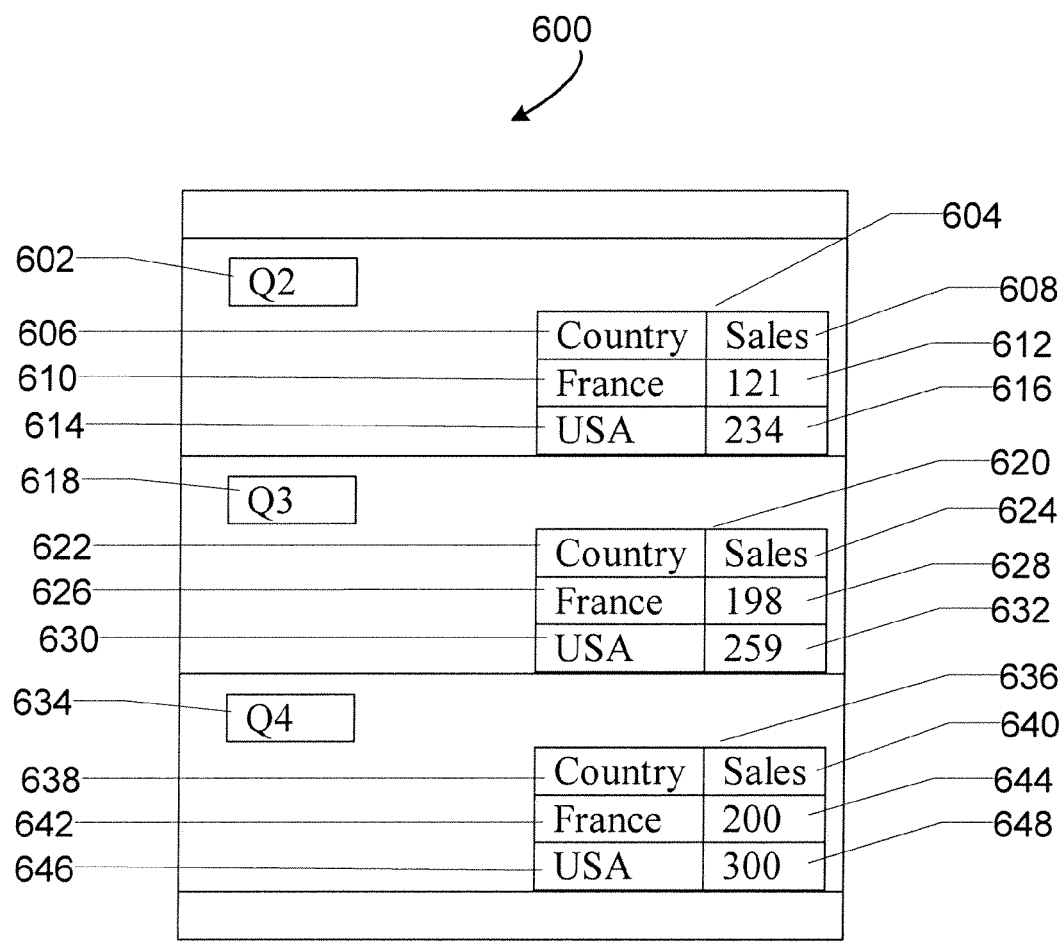
FIG. 6 illustrates a third section of a simplified report generated from the report specification of FIG. 3 in accordance with an embodiment of the invention.

FIG. 6 illustrates the third section 600 of the simplified exemplary report of FIG. 4. As in FIG. 5, report section 600 comprises Quarter cells 602, 618 and 634, and tables 604, 620 and 636. Table 604 comprises Country dimension 606 and Sales measure 608, Country cells 610 and 614, and corresponding Sales cells 612 and 616. Similarly, table 620 comprises Country dimension 622 and Sales measure 624, Country cells 626 and 630, and corresponding Sales cells 628 and 632. Further, Table 636 comprises Country dimension 638 and Sales measure 640, Country cells 642 and 646, and corresponding Sales cells 644 and 648. In an alternative embodiment, sections 400, 500 and 600, individually or together, may comprise one or more sub-reports or parts of one or more other reports. In such an embodiment, each sub-report may be individually indexed for searching, or may independently or in combination be used to define one or more context values for other reports.

Figure 7:
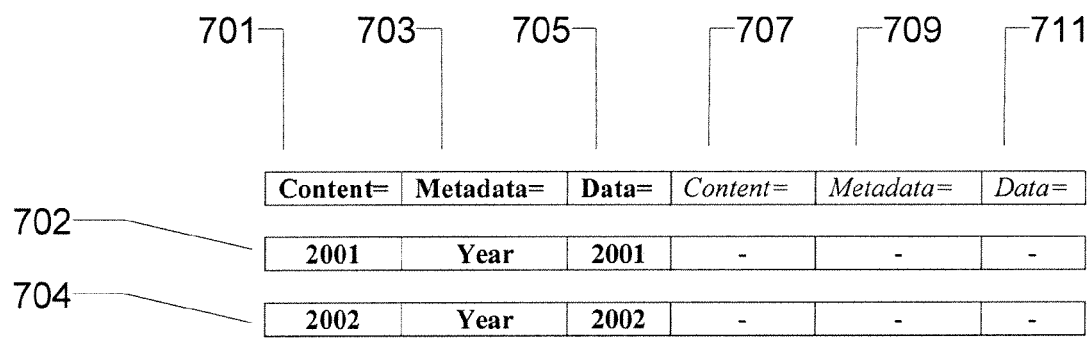
FIG. 7 illustrates a simplified index table created from the simplified report of FIGS. 4-7.

FIG. 7 illustrates a graphical representation of exemplary tabular index records 702 and 704 comprising report element instance values in columns for each of content 701, metadata 703, and data 705 fields, and corresponding report element instance context values in columns for each of context content 707, context metadata 709 and context data 711 fields, as may be extracted from Year cell report elements 402 and 536 of report sections 400 and 500, respectively. These indexed report element instance values and context values may be created by the implementation of operations 202 and 204 of FIG. 2. Values of index records 702 and 704 representing report element instance values in columns 701, 703 and 705 appear in bold type, and values representing report element instance context values in columns 707, 709 and 711 appear in italic type.

The values appearing index record 702 represent extracted report element instance values and context values corresponding to Year cell report element instance 402, and comprise the instance content value "2001", metadata value "Year" and data value "2001". There are no values represented in index record 702 for context values corresponding to Year cell element instance 402, since element instance 402 does not have any inherited context in report section 400, because the Year is the highest level of hierarchy present in report section 400. In alternative embodiments (not shown), context values may be inherited by a report element instance from a lower level of hierarchy (child level context inheritance) or from the same level of hierarchy (sibling level context inheritance).

The values appearing in index record 704 represent extracted report element instance values and context values corresponding to Year cell report element instance 536 on report section 500, and comprise the instance content value "2002", metadata value "Year" and data value "2002". As in index record 702 described above, there are no context values in index record 704, since element instance 536 has no context inherited from report page 400.

Figure 8:
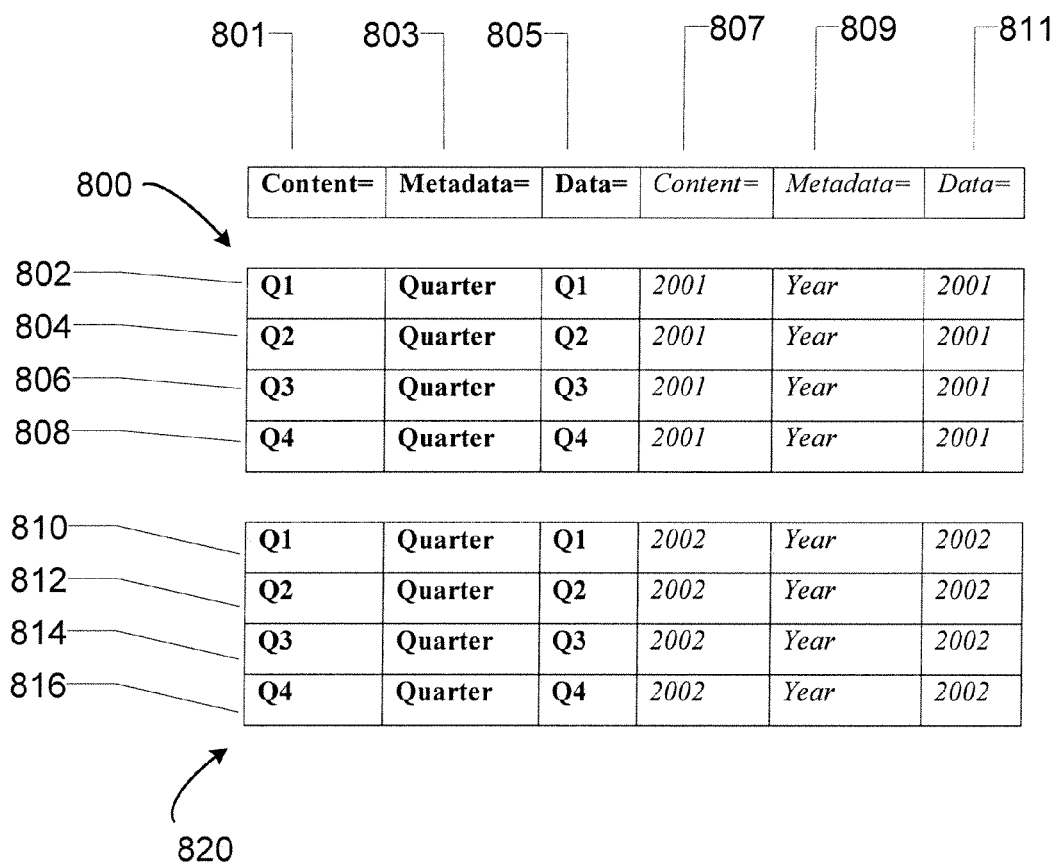
FIG. 8 illustrates a second simplified index table created from the simplified report of FIGS. 4-7.

FIG. 8 illustrates a graphical representation of exemplary tabular composite index records 800 and 820 comprising report element instance values in columns for each of content 801, metadata 803 and data 805 fields, and corresponding report element instance context values in columns for each of context content 807, context metadata 809 and context data 811 fields, as may be extracted from Quarter cell report elements 404 and 405 of report section 400, 502, 520, and 538 of report section 500, and 602, 618, and 634 of report section 600. These indexed report element instance values and context values may be created by the implementation of operations 202 and 204 of FIG. 2. As with index records 702 and 704 above, values of composite index records 800 and 820 representing report element instance values in columns 801, 803 and 805 appear in bold type, and values representing report element instance context values in columns 807, 809 and 811 appear in italic type.

The values appearing in index record 802 of composite index record 800 represent extracted report element instance values and context values corresponding to Quarter cell report element instance 404 on report section 400, and comprise the instance content value "Q1", metadata value "Quarter" and data value "Q1". Index record 802 also includes report element instance context values for report element instance 404, comprising context content value "2001", context metadata value "Year", and context data value "2001", which are inherited from Year cell 402 in report section 400.

As with index record SOS described above, index records 804, 806 and 808 of composite index record 800 represent extracted report element instance values and context values corresponding to Quarter cell report element instances 405, 502, and 520 respectively, and comprise extracted report element instance values for content, metadata and data fields, and report element instance context values for context content, context metadata and context data fields. In this embodiment, index records 802, 804, 806 and 808 are combined into composite index record 800 because they share the same report element instance context inherited from Year cell 402 in report section 400. Similarly, the values appearing in index records 810, 812, 814 and 816 of composite index record 820 represent extracted values from Quarter cell report element instances 538, 602, 618 and 634 respectively. Index records 810, 812, 814 and 816 are combined into composite index record 820 because they share the same report element instance context inherited from Year cell 536 in report section 500.

FIG. 9 illustrates a graphical representation of exemplary tabular composite index records 902, 904, 906, 908, 910, 912, 914 and 916 comprising report element instance values in columns for each of content 901, metadata 903 and data 905 fields, and corresponding report element instance context values in columns for each of content 907, metadata 909 and data 911 fields, as may be extracted from the table cells of table report elements 406, 418, 504, 522, 540, 604, 620, and 636 of report sections 400, 500 and 600. These indexed report element instance values and context values may be created by the implementation of operations 202 and 204 of FIG. 2. Similar to composite index records 800 and 820 above, values of index records 900 representing report element instance values in columns 901, 903 and 905 appear in bold type, and values representing report element instance context values in columns 907, 909 and 911 appear in italic type.

The values appearing in index record 902 represent extracted report element instance values and context values corresponding to table cell report element instances 408, 410, 412, 414, 416, and 417 of table 406 in report section 400, and comprise the report element instance content values "Country", "Sales", "France", "USA", "100", and "230", metadata values "Country" and "Sales", and data values "France" and "USA". Index record 902 also includes report element instance context values for table cells report element instances in table report element 406, comprising context content values "2001" and "Q1", context metadata values "Year" and "Quarter", and context data values "2001" and "Q1", which are inherited from Year and Quarter cells in report section 400.

As with the description of index record 902 above, index records 904, 906, 908, 910, 912, 914 and 916 represent extracted report element instance values and context values corresponding to table cells in tables 418, 504, 522, 540, 604, 620 and 636, respectively. Additionally similar to as described above, the report element instance context values for each table cell report element instance are inherited from the Year and Quarter cells in the section of the report in which the table cell report element instance is located.

FIG. 10 illustrates an exemplary series of processing operations for ranking reports and/or sub-reports, according to an embodiment of operation 210 of FIG. 2. The processing operations of FIG. 10 may be implemented by the computer 100 of FIG. 1, and more specifically, by search module 114. The first operation of FIG. 10 is to compile query results comprising a list of reports or sub-reports containing relevant report element instances 1000. Search module 114 may be used to implement this operation. In one embodiment, the compiled search query results comprise a list of reports or sub-reports which contain relevant report element instances, that is, report element instances having at least one value (for content, metadata, or data fields) that matches the search query.

The next operation of FIG. 10 is to determine a ranking factor in relation to the number of times an indexed report element instance value occurs in each report or sub-report 1002. Operation 1002 may use any suitable method or formula to determine the ranking factor in relation to the number of times any indexed report element instance value that matches the search query occurs in each report or sub-report, such that the resulting ranking factors may be used to distinguish the relative relevancy of each report or sub-report to the search query.

The next operation of FIG. 10 is to determine a ranking factor in relation to the level of hierarchy in a report or sub-report of the indexed report element instance values that match the search query 1004. Operation 1004 may use any suitable method or formula to determine the ranking factor in relation to the level of hierarchy in a report or sub-report of the indexed report element instance values that match the search query, such that the resulting ranking factors may be used to distinguish the relative relevancy of each report or sub-report to the search query.

The next operation of FIG. 10 is to determine a ranking factor in relation to which fields of indexed report element instance values contained in each report or sub-report match the search query 1006. Operation 1006 may use any suitable method or formula to determine the ranking factor for each report or sub-report, such that the resulting ranking factors may be used to distinguish the relative relevancy of each report or sub-report to the search query.

The next operation of FIG. 10 is to compile the relative ranking of reports or sub-reports 1008. The relative ranking of reports or sub-reports may be compiled from the individual ranking factors determined in operations 1002, 1004 and 1006. Any suitable method or formula may be used to compile a composite relative ranking of reports or sub-reports, such that the resulting composite relative ranking may be used to distinguish the relevancy of each report or sub-report to the search query.

The next operation of FIG. 10 is to return a ranked list of reports or sub-reports 1010. The ranked list of reports may be assembled by ordering reports or sub-reports according to the composite relative rankings compiled in operation 1008. The resulting ranked list may be returned to a user via a user interface, or may be returned to another computer program.

Figure 11:
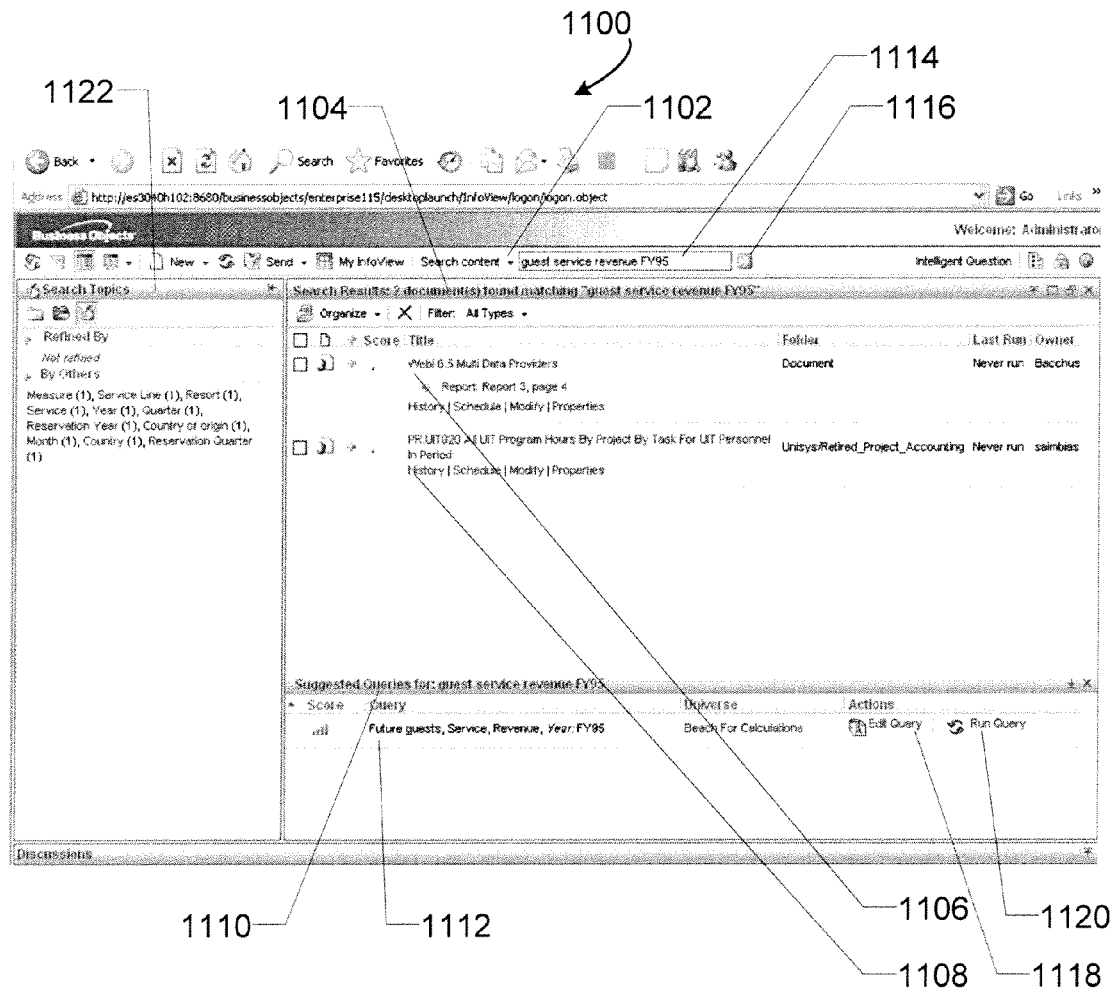
FIG. 11 illustrates a graphical user interface for implementing an embodiment of the invention.

FIG. 11 illustrates a graphical user interface (GUI) 1100 used to implement an embodiment of the invention. The GUI 1100 may be included in a window presented on an output device of computer 100. In one embodiment, GUI 1100 comprises multiple panes, including search query pane 1102, report search result pane 1104, optional proposed abstract query pane 1110 and optional related links pane 1122. Search query pane 1102 comprises search query input box 1114 and search query submit button 1116, which are used to receive a search query, such as according to operation 206 of FIG. 2. The search query may be received from a user, such as by the user entering one or more search terms in the search query input box 1114. The search query may then be submitted.

Report search result pane 1104 displays report results returned by the execution of a search query against index records from one or more existing report instances, comprising exemplary existing report links 1106 and 1108. The report search results may comprise, or be based on relevant report instances compiled according to operation 210 of FIG. 2. Optionally, report results displayed in report search result pane 1104 may also include additional information or metadata pertaining to the existing reports in the returned report search results, such as the name, date, author, location, history, and schedule of the existing reports.

Optional proposed abstract query panel 1110 displays proposed abstract query 1112 generated from the execution of a search query against index records from one or more semantic abstractions, such as by implementing the processing operations described in FIG. 2 or FIG. 5 of the commonly owned and concurrently filed U.S. patent application entitled "Apparatus and Method for Generating Queries and Reports", Ser. No. 11/537,592, filed Sep. 29, 2006.

Optional related links pane 1122 displays links or buttons identifying categories generated from common metadata or other information related to search terms entered in search query 1114 that appear in index records searched by the execution of a search query entered in search query input box 1114.

In an alternative embodiment, the exemplary ranking factors determined in operations 1002, 1004 and 1006 may comprise any combination of suitable ranking factors, or other methods or formulae to allow the compilation of a relative ranking of reports or sub-reports in operation 1008, and are not limited to the exemplary ranking factors described in operations 1002, 1004 and 1006. In yet a further embodiment, a list of reports containing report element instances matching the search query may be returned unranked, or with the option for a user to configure or choose how the reports or sub-reports may be ordered or ranked. In one embodiment, such a user-configurable option to choose how the reports or sub-reports are ranked may be implemented through a search results GUI or the like.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable medium storing executable instructions to:
   store a plurality of reports in a repository, wherein each report includes information automatically retrieved from a data source, where the information is structured in accordance with a report schema that specifies the form in which the information should be presented, wherein the report schema defines separate report elements as structural components found inside a report;
   extract, from each report of the plurality of reports, report element instance context metadata and report element instance context data to define indexed fields, wherein the report element instance context metadata specifies metadata that affects evaluation of a report element instance including context comprising a combination of parameters and the report element instance context data specifies data that affects evaluation of the report element instance;
   receive a search query;
   apply the search query against the indexed fields; and
   compile search query results to produce a list of relevant report element instances, wherein each report element instance is a single occurrence of a report element in a report and reports are ranked based on a composite ranking factor, the composite ranking factor being compiled from two or more ranking methods including a method based on a report element instance's level of hierarchy in a report or sub-report.

2. The computer readable medium according to claim 1 further comprising executable instructions to store a reference to a report containing each report element instance.

3. The computer readable medium according to claim 1 further comprising executable instructions to store a reference to a report and a section of a report containing each report element instance.

4. The computer readable medium according to claim 1 wherein further comprising executable instructions to store a reference to at least one data source for each report element instance.

5. The computer readable medium according to claim 1 wherein the query results further comprise a list of references to a report and section of a report containing each relevant report element instance.

6. The computer readable medium according to claim 1 further comprising executable instructions to store the indexed fields in a database.

7. The computer readable medium according to claim 1 wherein the search query is received from a user.

8. The computer readable medium according to claim 1 wherein the search query is automatically generated.

9. The computer readable medium according to claim 1 further comprising executable instructions to return compiled search query results to a user.

10. The computer readable medium according to claim 1 further comprising executable instructions to return compiled search query results to a processing module.

11. A method implemented on a computer, comprising:
    storing a plurality of reports in a repository, wherein each report includes information automatically retrieved from a data source, where the information is structured in accordance with a report schema that specifies the form in which the information should be presented, wherein the report schema defines separate report elements as structural components found inside a report, the report interpreting the information from the data source and performs calculations based on at least one calculation model;
    extracting, from each report of the plurality of reports in the report repository, report element instance context metadata and report element instance context data to define indexed
    fields, wherein the report element instance context metadata specifies metadata that affects evaluation of a report element instance according to the at least one calculation model including context with information used to calculate a report element instance and the report element instance context data specifies data that affects evaluation of the report element instance;
    receiving a search query;
    applying the search query against the indexed fields; and
    compiling search query results to produce a list of relevant report element instances, wherein each report element instance is a single occurrence of a report element in a report and reports are ranked based on a composite ranking factor, the composite ranking factor being compiled from two or more ranking methods including a method based on a report element instance's level of hierarchy in a report or sub-report.

12. The method according to claim 11 further comprising storing a reference to a report containing each report element instance.

13. The method according to claim 11 further comprising storing a reference to a report and to a section of a report containing each report element instance.

14. The method according to claim 11 further comprising storing a reference to at least one data source for each report element instance.

15. The method according to claim 11 wherein the query results further comprise a list of references to a report and section of a report containing each relevant report element instance.

16. The method according to claim 11 further comprising storing the indexed fields in a database.

17. The method according to claim 11 wherein the search query is received from a user.

18. The method according to claim 11 wherein the search query is automatically generated.

19. A system comprising:
  at least one data processor;
  memory coupled to the at least one data processor storing instructions, which when executed cause the at least one data processor to:
    store a plurality of reports in a repository, wherein each report includes information automatically retrieved from a data source, where the information is structured in accordance with a report schema that specifies the form in which the information should be presented, wherein the report schema defines separate report elements as structural components found inside a report;
    extract, from each report of the plurality of reports, report element instance context metadata and report element instance context data to define indexed fields, wherein the report element instance context metadata specifies metadata that affects evaluation of a report element instance including context comprising a combination of parameters and the report element instance context data specifies data that affects evaluation of the report element instance;
    receive a search query;
    apply the search query against the indexed fields; and
    compile search query results to produce a list of relevant report element instances, wherein each report element instance is a single occurrence of a report element in a report and reports are ranked based on a composite ranking factor, the composite ranking factor being compiled from two or more ranking methods including a method based on a report element instance's level of hierarchy in a report or sub-report.

* * * * *